OPTICAL COMMUNICATIONS SYSTEM

Filed April 18, 1963 3 Sheets-Sheet 1

INVENTOR
NUMA E. THOMAS

BY

ATTORNEYS

Nov. 2, 1965 N. E. THOMAS 3,215,842

OPTICAL COMMUNICATIONS SYSTEM

Filed April 18, 1963 3 Sheets-Sheet 2

INVENTOR
NUMA E. THOMAS

BY

ATTORNEYS

Nov. 2, 1965 N. E. THOMAS 3,215,842

OPTICAL COMMUNICATIONS SYSTEM

Filed April 18, 1963 3 Sheets-Sheet 3

INVENTOR
NUMA E. THOMAS

BY

F. W. O'Brien
Wallace J. Nelson
ATTORNEYS 3,215,842
Patented Nov. 2, 1965

3,215,842

OPTICAL COMMUNICATIONS SYSTEM

Numa E. Thomas, Newport News, Va., assignor to the United States of America as represented by the Administrator of the National Aeronautics and Space Administration Filed Apr. 18, 1963, Ser. No. 274,065
11 Claims. (Cl. 250—199)
(Granted under Title 35, U.S. Code (1952), sec. 266)

The invention described herein may be manufactured and used by or for the Government of the United States of America for governmental purposes without the payment of any royalties thereon or therefor.

This invention relates generally to a communications device and relates with particularity to a semipassive communications system wherein intelligence is transmitted from a first site to a second site by means of modulating a light beam.

In general, communications between two remote sites is presently carried on by means of voice communication through the use of telephone or radio, or by Morse code light signals. In each of these systems, various situations can arise which make use of the system highly disadvantageous or impossible of operating, such for example in air-to-air emergency communication, when transmitting classified communications, ship-to-ship communications, and the like. Also, the problems of frequency allocation in regard to radio broadcasting and the problem of wires when involved with telephones limit the practical capability of these systems under certain conditions. In addition, each of the above known systems for intelligence communication are subject to being monitored by those to which the communications is not intended, and may be jammed or intercepted by undesirable recipients while also normally requiring considerable setup time and maintenance.

There is, thus, an urgent need in the art for a reliable light wave or other simple communications system which can be operated under adverse conditions by semiskilled personnel under emergency conditions without the requirements of expensive and time-consuming setup and maintenance problems.

Light-wave type of communications systems have been employed before; however, in all known prior art systems of this type, the capabilities thereof were limited due to the requirements for power supplies at both the transmitter and receiver of the light beams. Also, alinement problems between the transmitter and the receiver, in the presently known acoustical responsive light wave communication devices, are critical for operation thereof. The present invention combines the advantageous features of these known prior art systems while minimizing the alinement problems therein by employing a unique passive reflector-modulator which is essentially immune to alinement problems for operation thereof.

Accordingly, it is an object of the present invention to provide a new and novel communications system.

Another object of the present invention is to provide a communications system that cannot be monitored by anyone to which the message is not intended.

Still another object of the instant invention is the provision of a communications system operable by a novice under emergency conditions.

A further object of this invention is to provide a communications system that requires no frequency allocation.

A still further object of the present invention is the provision of a semipassive communications device dependent upon light wave modulation.

An additional object of the present invention is the provision of a novel mechanism for modulating a light beam.

A still further additional object of the present invention is a new and novel device for the transmission of intelligence by modulation of a beam of light.

Another object of the present invention is to provide a long-lived passive modulator device requiring no setup time or maintenance for use in an optical communication system.

In accordance with the present invention, the foregoing and other objects are attained by providing a lens with a source of illumination at its focus for projecting a beam of light, a retrodirectional reflector for modulating and returning the beam parallel to itself and a larger collecting lens for collecting and concentrating the return beam and focusing it on a photodetector. The projection and collecting optics are built into a single unit with a photodetector also contained therein and in electrical connection with an amplifier and suitable utilization mechanism. The retrodirectional reflector, which is positioned at a remote site from which intelligence is desired to be obtained is so constructed and arranged as to return the light wave parallel to itself where it is collected by the collecting optics at the first site. The retrodirectional reflector, according to the present invention, is a passive modulator and consists of a corner reflector having three faces, one or more of which is an optically reflective flexible diaphragm. The important property of this peculiar corner reflector lies in its effect on the behavior of the light beam returned from it.

It is well known that perfect corner reflectors have rigid orthogonal faces and always send back incident energy exactly parallel to the arrival direction. Thus, the deformation of any one of the reflecting faces of a corner reflector will effect modulation of the reflected light rays. The optically reflective flexible diaphragm face or faces of the corner reflector in the present invention are positioned so that upon the influence of sound waves, such for example the voice of a speaker directed against the diaphragm, flexing of the diaphragm in proportion to the sound imparted thereto will be experienced with corresponding modulation of the light beams being reflected therefrom. This modulated beam is collected by the collecting optics at the first site and focused onto a photodetector wherein it is converted into electrical impulses corresponding to the sound waves imparted to the diaphragm at the remote site. These electrical impulses are amplified by a conventional amplifier leading to a suitable utilization output, such for example, a speaker.

A more complete appreciation of the invention and many of the attendant advantages thereof will be readily apparent as the same becomes better understood by reference to the following detailed description when considered in connection with the accompanying drawings wherein.

Figure 1:
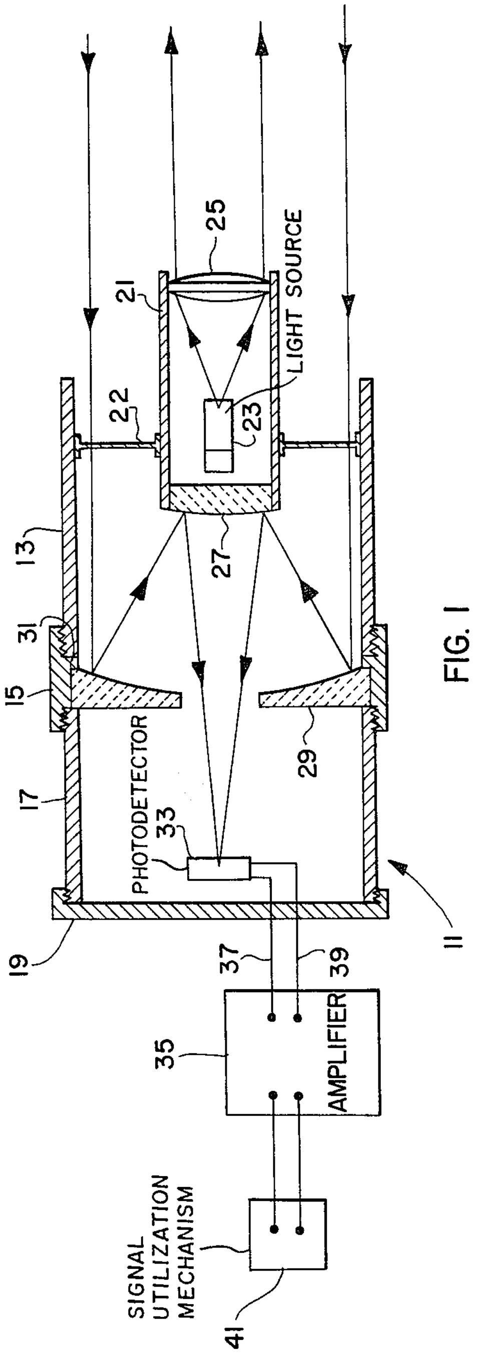
FIG. 1 is a schematic representation of the light source receiver unit, amplifier and utilization mechanism constructed in accordance with the present invention.

Referring now to the drawings, and more particularly to FIG. 1 there is shown a light-source-receiver unit, generally designated by reference numeral 11. Light source receiver unit 11 includes a tubular housing 13, externally threaded at one end thereof, in threaded connection with an internally threaded flange connector 15. The other end of flange connector 15 also threadingly receives a tubular housing 17 with the opposite end of housing 17 being closed by an internally threaded end cap 19.

A reduced diameter tubular container 21 is disposed along the longitudinal axis of unit 11 and maintained adjacent the open end of housing 13, by an annular spider 22. A unidirectional light source 23 powered by a battery or other conventional power supply, not shown, is suitably maintained within container 21 with an adjustable concentrating lens 25 closing one end of container 21 and in such position as to concentrate the light waves received from light source 23 into a beam. The other end of container 21 is closed by a rearwardly directed convex mirror 27. An annular concave collecting mirror 29 is maintained within unit 11 by flange connector 15 and is adapted to rest on the shoulder 31 formed about the interior surface of connector 15. A suitable photodetector 33 is maintained within housing 17 adjacent end cap 19, in conventional manner, and is in electrical connection with an amplifier 35 through suitable electrical lead wires 37 and 39 passing through end cap 19. Amplifier 35 is in electrical connection with suitable utilization mechanism 41, as will be further explained hereinafter.

Figure 3:
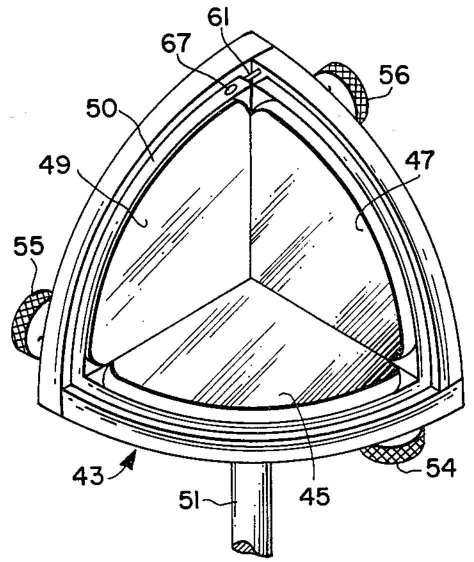
FIG. 3 is a perspective view of the unique corner reflector as employed in the present invention and illustrating one form of mounting structure therefor.

Referring now to FIG. 3, the reflector-modulator unit, generally designated by reference numeral 43, consists of a corner reflector in which two of the three mutually perpendicular surfaces of the reflector are conventional rigid mirrors 45 and 47. The third reflecting surface of reflector 43 is an optically reflecting flexible diaphragm 49. Diaphragm 49 may be constructed of a flexible material, such for example Dupont's Mylar film, having a reflective coating of, for example, evaporated aluminum thereon and prepared in conventional manner. Mylar is a polyester film made from polyethylene terephthalate, the polymer formed by the condensation reaction between ethylene glycol and terephthalic acid and is commercially available in essentially any desired thickness. Diaphragm 49 has an overall thickness of approximately 0.5 mil and is stretched and attached by cementing, clamping or the like to an open frame 50 for positioning in unit 43. Other flexible materials having reflective surfaces are obviously also within the scope of this invention. An elongated rod 51 may be attached to reflector modulator unit 43 to serve as a mounting or holding structure for this unit. Any suitable connection, such for example as bolt 53, FIG. 4, may be employed to attach rod 51 to unit 43.

Figure 4:
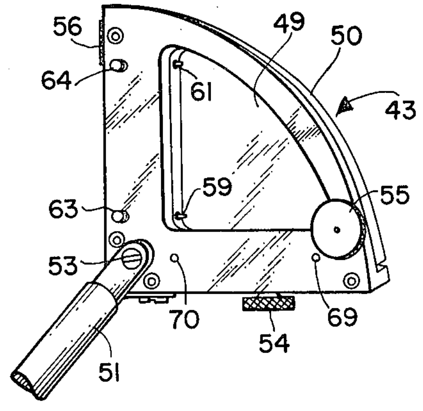
FIG. 4 is another view of the corner reflector employed in the present invention and illustrating the rearward exposed side of the flexible diaphragm modulating face of the reflector onto which the intelligence is imparted to cause modulation of the light beam being reflected from the front side thereof.

To permit easy assembly of unit 43, each of reflector surfaces 45, 47, and 49 are positioned therein by its own pair of steel dowel pins extending through the exterior wall of unit 43 into the open framework of the respective reflective surface along one side therof. The ends of dowel pins 59 and 61 for surface 49 are shown in FIG. 4 extending through open framework 50. A pair of set screws 63 and 64 are provided perpendicular through one surface of the exterior wall of unit 43 to secure dowel pins 59 and 61 in position. Similar set screws, one of which is shown in FIG. 3 and designated by reference numeral 67, are provided to retain the respective dowel pins in the framework of each of the reflective surfaces. Dowel pins 69 and 70 for surface 45 are illustrated in FIG. 4. Suitable adjusting screws 54, 55, and 56 are provided for respective angular adjustment of surfaces 45, 47 and 49 about their respective dowel pin flex pivots to permit assembly of the surfaces in mutually perpendicular alinement. This simple adjustment for each of the reflective surfaces permits the critical alinement of the surfaces and eliminates critical tolerances in fabrication thereof that would otherwise be required to achieve a perfect corner reflector. Once alinement of the surfaces is attained, adjusting screws, 54, 55, and 56 maintain the surfaces in position against the slight tension being exerted thereon by the flex pivot dowel pins.

*Operation*

Figure 2:
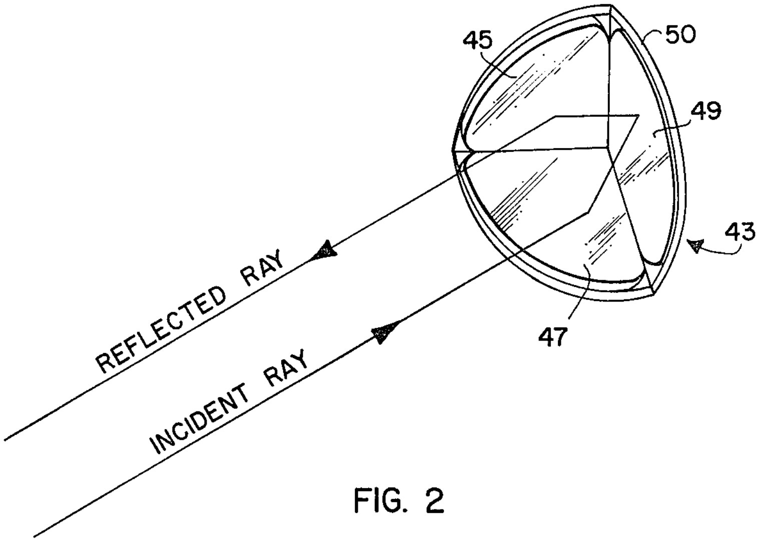
FIG. 2 is a schematic representation of the unique corner reflector as employed in the present invention and showing the incident and reflected light wave direction.

Since it is well known that perfect corner reflectors, having rigid orthogonal faces, always send back incident energy exactly parallel to the arrival direction, as schematically illustrated in FIG. 2, it is readily apparent that deformation of one of the reflecting faces immediately effects modulation of returned rays. Since the energy incident of one face must also be reflected by the other two, it is sufficient to have only one of the reflecting surfaces made as a flexible diaphragm, as shown, although it is also within the scope of this invention to provide two or all of the reflective surfaces of flexible diaphragm construction.

Information causing deformation of any or all of the reflecting faces is carried on the return beam by virtue of an angular spreading of the returned rays in such manner that the energy per unit area falling on a receiver varies in accordance with the modulation impressed on the flexible face 49 of the corner reflector 43.

In operation, therefore, light from source 23 is concentrated and focused by lens 25 into a beacon light in the general direction of reflector-modulator unit 43 which may be positioned at a considerable distance from light-source-receiver unit 11. The reflector-modulator 43 returns the light beam parallel to itself where it is collected by the larger optical system, 27 and 29, and focused onto the photodetector 33. The width of the returned light beam is approximately twice the diameter of the corner reflector plus the diameter of the original light source which in the illustrated embodiment can be taken to be the diameter of the projecting lens and accounts for the needed larger collecting optics.

The optically reflecting diaphragm 49 of corner reflector 43 may be modulated either acoustically or electrically. This modulating action produces a focusing effect and results in the returned light beam being alternately expanded and contracted with a consequent fluctuation in intensity at the collecting optics 27 and 29. The photodetector 33 converts these changes in intensity to electrical impulses which are amplified by amplifier 35 leading to utilization circuitry 41.

Figure 5:
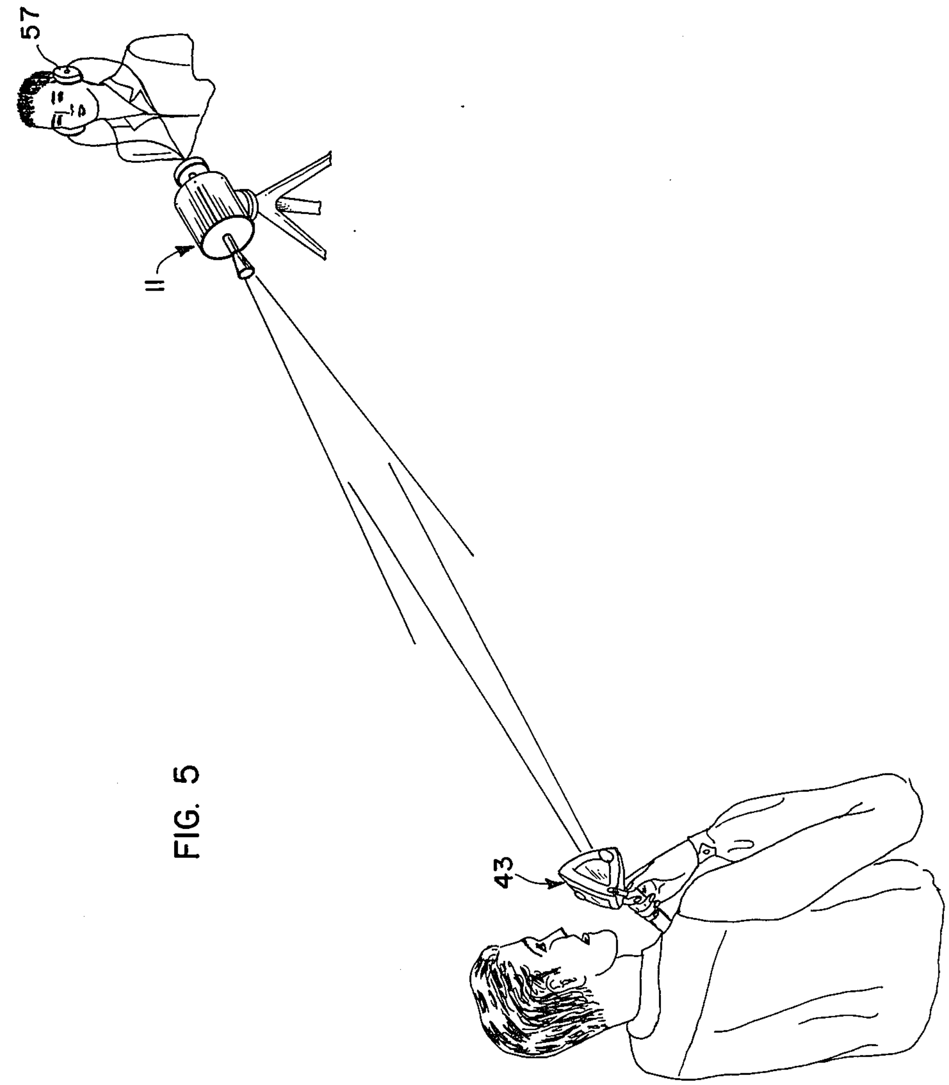
FIG. 5 is a schematic representation of how the optical system of the present invention would be operated over a distance as a voice communication link between two individuals.

As shown in FIG. 5, a signal, such for example a voice sound, when directed onto the rear of flexible face 49 will cause flexing of face 49 in proportion to the sound imparted thereagainst with concurrent modulation of the reflected light ray directed toward light-source receiver unit 11. This reflected ray of light, being returned essentially parallel to the light source, is received by annular collecting mirror 29 and reflected toward concentrating mirror 27 where it is reflected onto photodetector 33 and converted into electrical signals. These signals are then transmitted to amplifier 35 and utilization circuit 41 and transcribed as the signal or voice originally imparted to diaphragm 49.

In the illustration shown in FIG. 5, this utilization mechanism 41 is in the form of ear phones 57 although it is apparent that any other conventional type of utilization mechanism may be employed within the scope of this invention. Thus, as schematically illustrated in FIG. 5, a steady beam of light from a distant source can be modulated and sent back to the source by passive corner reflector-modulator unit 43 which requires no power other than that supplied by the voice of the speaker acting directly upon the flexible face 49 of modulator unit 43 (FIG. 4).

A working model of the presently described invention has been constructed which utilizes a battery powered 25-watt zirconium concentrated arc lamp light source. The modulator-reflector 43 in this experimental model was fabricated using two rigid mirrors and one stretched diaphragm of 0.5 mil aluminized Mylar film. This stretched diaphragm was cemented to open framework 50 by a conventional adhesive. Framework 50 is designed to facilitate assembly and adjustment thereof by adjusting screws 55 within corner reflector unit 43, as pointed out hereinbefore.

With this rudimentary model, clear audible transmissions of voice and musical content have been made over a distance exceeding one-half mile in bright sunlight. With higher power light source and refined design in both the light-source-receiver unit 11 and the reflector-modulator unit 43, there appears to be no practical limit to the communications range permissible when employing the teachings of the present invention.

Figure 6:
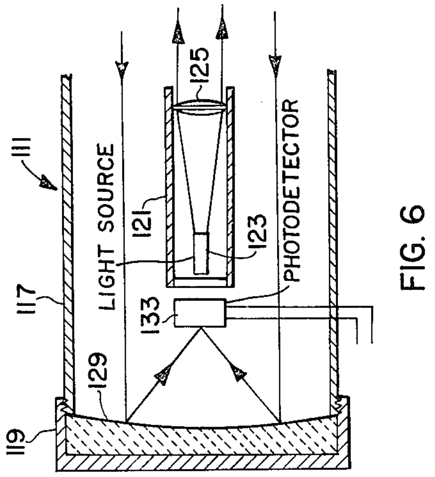
FIG. 6 is a schematic representation of an alternate embodiment of the light source receiver unit.

Referring now to FIG. 6, a schematic representation of an alternate embodiment of the light-source-receiver unit 111 is shown and includes a tubular housing 117 closed at one end by an end cap 119. A reduced diameter tubular housing 121 is disposed along the longitudinal axis of unit 111 and maintained adjacent the open end of housing 117 by suitable structure, not shown. A unidirectional light source 123 is maintained within housing 121 in a suitable manner with an adjustable concentrating lens 125 closing the open end of housing 121 in such position as to concentrate the light waves received from light source 123 into a beam. In this embodiment the receiving optics for the reflected beam consists of plano-concave mirror 129 which directs the reflected light waves directly onto photodetector 133. The remaining operation of this embodiment is the same as that described hereinbefore in reference to FIG. 1 with photodetector 133 being in electrical connection with suitable amplifier and utilization mechanism, not shown.

Figure 7:
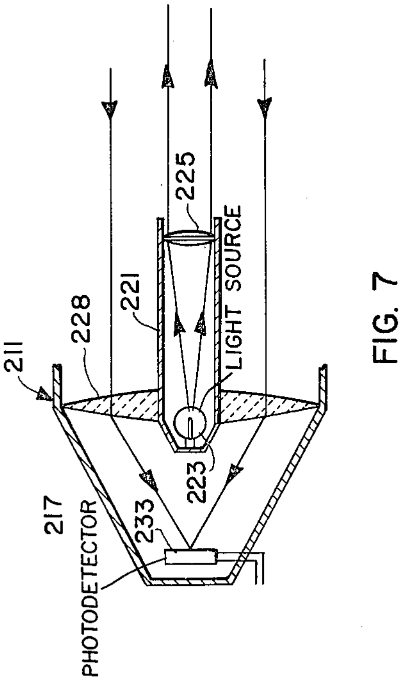
FIG. 7 is a schematic representation of another alternate embodiment of the light-source-receiver unit constructed in accordance with the present invention.

A further modification illustrated in FIG. 7 shows the light-source-receiver unit 211 including a frusto-conical housing 217. A tubular housing 221 of smaller diameter than the base of conical housing 217 houses light source 223 with concentrating lens 225 being provided therein for focusing the light from source 223. In this embodiment, the hereinbefore described concave lens is replaced by the annular refractory lens 228 which is positioned within the open base end of conical housing 217 and around tubular housing 221. Refractory lens 228 serves as connecting structure for the two housings while also serving to receive the reflected light waves and direct them onto photodetector 233. The remaining operation of this embodiment is the same as that described hereinbefore in reference to FIG. 1 with photodetector 233 being in electrical connection with suitable amplifier and utilization circuitry, not shown.

Although only selective embodiments of the present invention have been specifically described, it is readily apparent to those skilled in the art that the principle described herein is equally applicable to intelligence communication by microwave, visible light, infrared, and untraviolet frequencies, to mention but a few possibilities.

It is also anticipated that the present invention will find utility in providing a voice communications system for use in manned flight reentry where present-day communications systems tend to undergo blackout conditions during various phases of the reentry trajectory. When utilizing the present invention under these conditions, a laser could be employed for the source of light and the lightweight passive reflector-modulator unit 43 would be positioned in the reentering body in position to be influenced by voice sounds emanating from the occupant of the reentry vehicle. The possibility of other uses, such for example in ship-to-ship communications, surveying team communications, police and intelligence work, and forest-fire control are readily apparent to those skilled in the art. Also, during air-sea rescue operations, the passive modulator unit 43 could be packed in survival gear or air-dropped to the stranded operator to facilitate rescue operations.

Because the returned beam according to the present invention is always parallel to the incident beam, except for the fluctuations in spread caused by the modulation, and because there is no information on the incident beam, the information-carrying returned beam can only be intercepted by looking directly along the return signal path toward the modulator 43. The system is therefore line-of-sight in character and the presence of an object interposed in the communications beam of sufficient size to interrupt or block off the incident beam from the modulator will obviously stop communications. However, the presence of small particles in the incident beam path, such as fog, dust, and the like will not cause system failure until the roundtrip energy falls below the receiver capabilities.

This system is therefore jamproof, that is, it cannot be jammed by signal generation. The system also cannot be monitored since the modulated energy is absorbed at the light-source-receiver unit. The operation of this system requires no frequency allocation, and the reflector-modulator can be operated under emergency conditions by a novice in that it requires no setup time or maintenance since it is a long-lived passive unit. Two-way communication could obviously be achieved within the scope of this invention by simply mounting a passive modulator on each source-receiver unit.

Due to the unique features of corner reflectors, this system is relatively insensitive to orientation of the passive modulator 43 and acquisition and pointing of the two units are not critical to the operation of the device. Thus, the light-source-receiver unit 11, first with a broadened beam of light from source 23, may be aimed in the general direction of the modulator-receiver unit 43 and when communication is established, the light-source-receiver beam is reduced in spread and corrected in orientation to achieve a more intense signal by conventional means.

It is the unique optical characteristics of the corner reflector that alleviate the pointing problems of the system and also contributes to a system which has relatively low energy loss with distance. It is for the latter reasons that extremely long ranges are possible when utilizing the present invention for extreme distance communication.

Since it has already been determined that light rays can be bounced off the Moon's surface, it is anticipated that by using a high-powered light source, such for example a laser and by providing an astronaut explorer on the Moon's surface with the lightweight passive reflector, voice communication between the Earth and the Moon could be maintained by utilizing the present invention.

Obviously, many modifications and variations of the present invention are possible in the light of the above teachings. For example, although the surfaces of reflector unit 43 are illustrated in the form of sectors, corner reflectors constructed of square or rectangular reflecting surfaces are obviously also within the scope of this invention. It is therefore to be understood that within the scope of the appended claims, the invention may be practiced otherwise than as specifically described herein.

What is claimed and desired to be secured by Letters Patent of the United States is:

1. Apparatus for transmitting a signal between two sites comprising: a first unit at one site housing a lens and a source of light in position to be focused into a beam by said lens, a second unit at a remote site, said second unit including a multisurface reflector for returning the beam parallel to itself, at least one reflective surface of said reflector comprising an acoustically responsive diaphragm for modulating said beam, said first unit also containing optical means for collecting and focusing the returned beam, a photodetector for receiving and converting changes in beam intensity of the returned beam as a result of acoustical modulation by said diaphragm into electrical impulses, means for amplifying said electrical impulses, and utilization means for converting the amplified impulses into the acoustics imparted to said diaphragm at said remote site.

2. Apparatus for transmitting intelligence between two sites, comprising: a first unit at one site and a second unit at a remote site, said first unit including a source of light and a lens for focusing said light into a beam, said second unit including a passive multisurface reflector constructed and arranged so as to receive and return the beam of light from said first unit substantially parallel to itself, said reflector including acoustically vibratile means for modulation of said beam of light by acoustics imparted thereto at said remote site to vary the intensity of the reflected beam, said first unit further including means for receiving and converting changes in the reflected beam intensity into detectable electrical impulses.

3. Apparatus for transmitting intelligence between two sites, comprising: a first unit at one site and a second unit at a remote site, said first unit including a housing, a source of light within said housing, a lens within said housing for focusing said light into a beam, said second unit including a passive multisurface reflector constructed and arranged so as to receive and return the beam of light from said first unit parallel to itself, said reflector including intelligence responsive means for modulation of said beam of light in response to and in proportion to acoustical signals imparted thereagainst at said remote site to vary the intensity of the reflected beam, said first unit further including a photodetector for receiving and converting changes in the reflected beam intensity into electrical impulses, and means for amplifying and utilizing the impulses.

4. Apparatus according to claim 3 including optical means at said first site for concentrating the reflected beam of light prior to receipt thereof by said photodetector.

5. Apparatus according to claim 4 wherein said optical means includes an annular concave mirror and a convex lens in optical alinement therewith.

6. A reflector for returning a beam of light parallel to a light source comprising: three mutually perpendicular reflective surfaces in intimate contact, at least one of said reflective surfaces comprising a rigid open framework having a flexible diaphragm spanning the opening and fixedly secured along the periphery thereof, said flexible diaphragm being provided with an exposed reflective surface said flexible diaphragm being a plastics film and having an aluminum coating thereon constituting said reflecting surface, said fixed periphery of said flexible diaphragm being maintained in mutual perpendicular alinement with the remaining reflective surfaces while the reflective surface area circumscribed by the fixed periphery is so constructed and arranged as to be signal-responsive flexibly vibratile to effect detectable modulation of a reflected light beam.

7. A system for providing a communication link between two distant sites, comprising:

means at a first site for projecting a beam of light toward a remote second site,
means at said remote second site for reflecting the light waves of said beam of light substantially parallel to itself,
said means at said remote site effecting modulation of light waves reflected therefrom as a result of acoustical intelligence imparted thereto at said remote site,
means at the first site for collecting and focusing the reflected modulated light waves, means for converting the reflected modulated light waves into electrical impulses,
means for amplifying said electrical impulses,
means for converting and transcribing the amplified electrical impulses into the acoustical intelligence emanating from said second site, said means at said remote second site including:
a passive corner reflector,
said corner reflector having two rigid faces and one flexible orthogonal face,
each of said rigid faces and said flexible face having an exposed reflective surface and a surface secured to its individual frame,
each said individual frame being positioned within a corner housing,
a plurality of dowel pins extending through said corner housing and received by portions of each individual frame,
means on said corner housing for locking said dowel pins in position,
means on each individual frame for securing said dowel pins therein,
said dowel pins being constructed and arranged so as to constitute flex pivots for each said individual frame,
and means for angularly adjusting said individual frames within said corner housing to accurately aline said individual faces therein.

8. A system for providing a communication link between two distant sites, comprising:

means at a first site for projecting a beam of light toward a remote second site,
means at said remote second site for reflecting the light waves of said beam of light substantially parallel to itself,
said means at said remote site effecting modulation of light waves reflected therefrom as a result of acoustical intelligence imparted thereto at said remote site,
means at the first site for collecting and focusing the reflected modulated light waves,
means for converting the reflected modulated light waves into electrical impulses,
means for amplifying said electrical impulses,
means for converting and transcribing the amplified electrical impulses into the acoustical intelligence emanating from said second site,
said means at said first site for collecting and focusing the reflected modulated light waves includes:
an annular concave mirror in axial alinement with said means for projecting the beam of light; and,
a convex collimating lens.

9. A system as in claim 8 wherein said means at said first site for collecting and focusing the reflected modulated light waves is a concave mirror and said means for converting the reflected modulated light waves into electrical impulses is a photodetector, said photodetector being housed between said concave mirror and said means at said first site for projecting a beam of light.

10. A system as in claim 8 wherein said means at said first site for collecting and focusing the reflected modulated light waves is an annular refractory lens, said annular refactory lens being housed in circumferential relationship to said means for projecting a beam of light.

11. A passive reflector for returning electromagnetic waves along a parallel path from a remote electromagnetic energy source, comprising:

a corner reflector having an open corner housing,
said corner reflector including two rigid and one flexible face,
each said rigid face and said flexible face being secured to its individual open framework,
said flexible face being so constructed and arranged as to flexibily vibrate in response to acoustical signals imparted thereagainst and thereby modulate reflected incident electromagnetic waves in proportion to the acoustical signal, means for securing each said individual framework within said open corner housing, means for individually angularly adjusting each of said faces within said corner housing to attain alinement thereof, said means for securing said individual framework within said open corner housing including, a plurality of dowel pins extending through said corner housing and received by portions of each individual frame, said dowel pins being so constructed and arranged as to form flex pivots for each individual framework, a plurality of set screws equal in number to said dowel pins extending through said corner housing for individually locking said dowel pins in position therein, and means extending through said open corner housing to engage each said framework for effecting angular adjustment thereof.

References Cited by the Examiner

UNITED STATES PATENTS

| | | | |
|---|---|---|---|
| 1,384,014 | 7/21 | Fessenden. | |
| 2,345,445 | 3/44 | Atwood | 250—199 |
| 2,432,984 | 12/47 | Budonbom | 343—18 |
| 2,466,000 | 4/49 | Brown | 250—199 |
| 2,543,130 | 2/51 | Robertson | 343—18 |
| 2,888,675 | 5/59 | Pratt et al. | 343—18 |
| 2,953,059 | 9/60 | Rodman et al. | |
| 3,047,860 | 7/62 | Swallow et al. | 343—18 |
| 3,065,352 | 11/62 | McFarlane | 250—199 |

FOREIGN PATENTS

| | | |
|---|---|---|
| 21,856 | 10/03 | Great Britain. |
| 317,318 | 5/30 | Great Britain. |

DAVID G. REDINBAUGH, *Primary Examiner.*